(12) United States Patent
Hermes et al.

(10) Patent No.: US 8,822,590 B2
(45) Date of Patent: Sep. 2, 2014

(54) MALEIC ANHYDRIDE COPOLYMERS AS SOLUBLE SUPPORT MATERIAL FOR FUSED DEPOSITION MODELLING (FDM) PRINTER

(75) Inventors: Florian Hermes, Frankfurt (DE); Stefan Bernhardt, Offenbach (DE); Dirk Poppe, Franfurt am Main (DE); Guenter Schmitt, Darmstadt (DE); Markus Pridoehl, Grosskrotzenburg (DE); Gerd Loehden, Essen (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/982,431

(22) PCT Filed: Mar. 13, 2012

(86) PCT No.: PCT/EP2012/054306
§ 371 (c)(1),
(2), (4) Date: Jul. 29, 2013

(87) PCT Pub. No.: WO2012/143182
PCT Pub. Date: Oct. 26, 2012

(65) Prior Publication Data
US 2013/0317164 A1    Nov. 28, 2013

(30) Foreign Application Priority Data

Apr. 20, 2011   (EP) .................................. 11163199

(51) Int. Cl.
| | | |
|---|---|---|
| *C08F 222/08* | (2006.01) | |
| *C08F 222/06* | (2006.01) | |
| *C08K 3/36* | (2006.01) | |
| *B29C 67/00* | (2006.01) | |
| *C08F 220/06* | (2006.01) | |

(52) U.S. Cl.
CPC ............. *C08F 222/08* (2013.01); *C08F 222/06* (2013.01); *C08K 3/36* (2013.01); *B29C 67/0092* (2013.01); *C08F 220/06* (2013.01)
USPC ......... 524/549; 526/272; 526/271; 526/317.1

(58) Field of Classification Search
CPC .... C08F 222/08; C08F 222/06; C08F 220/06; C08K 3/36; B29C 67/0092
USPC ........................ 524/549; 526/272, 271, 317.1
See application file for complete search history.

(56) References Cited

U.S. PATENT DOCUMENTS

| | | | |
|---|---|---|---|
| 6,790,403 B1 * | 9/2004 | Priedeman et al. ........... 264/442 |
| 2005/0004282 A1 | 1/2005 | Priedeman et al. | |
| 2010/0096072 A1 | 4/2010 | Hopkins et al. | |
| 2010/0270707 A1 | 10/2010 | Priedeman et al. | |

FOREIGN PATENT DOCUMENTS

| | | |
|---|---|---|
| EP | 0 047 889 | 3/1982 |
| WO | 2010 045147 | 4/2010 |
| WO | WO 2010045147 A2 * | 4/2010 |

OTHER PUBLICATIONS

International Search Report Issued Apr. 16, 2012 in PCT/EP12/054306 filed Mar. 13, 2012.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The invention relates to a novel support material for the fused deposition modelling process for producing three-dimensional objects. The invention relates more particularly to a 3D printing process involving support materials which are easier to remove than in the prior art. The support materials according to the invention are styrene-maleic anhydride copolymers for example.

12 Claims, No Drawings

MALEIC ANHYDRIDE COPOLYMERS AS SOLUBLE SUPPORT MATERIAL FOR FUSED DEPOSITION MODELLING (FDM) PRINTER

TECHNICAL FIELD

The invention relates to a novel support material for the fused deposition modelling process for producing three-dimensional objects. The invention relates more particularly to a 3D printing process involving support materials which are easier to remove than in the prior art. The support materials according to the invention are styrene-maleic anhydride copolymers for example.

PRIOR ART

Rapid prototyping or rapid manufacturing processes are processes of fabrication designed to transpose existing three-dimensional CAD data ideally without manual diversions or forming directly and rapidly into workpieces.

Rapid prototyping processes have come to be differentiated into various forms, which can be subdivided into two groups: laser-based processes and processes without use of a laser.

Stereolithography (SLA) is the best known laser-based and also oldest 3D printing process. It comprises a liquid composition of a radiation-curable polymer being cured with a laser layer by layer. This process is greatly limited in its usefulness.

A similar process is the selective laser sintering (SLS) process wherein a powdery raw material, for example a thermoplast, sand or a sinterable metal, is selectively sintered with a laser layer by layer similarly to the SLA process. SLS is again only able to realize very specific 3D objects. The same holds for the third laser-based process—laminated object manufacturing—wherein layers of adhesive-coated paper or plastic are successively glued together and cut to shape using a laser.

The UV inkjet process is a well-known versatile 3D printing process. It is a three-stage process wherein a powdery material is applied in thin layers, a UV-curable liquid is printed thereon in the form of the particular layer of the later three-dimensional product, and finally the printed layer is cured with a UV source. These process steps are repeated layer by layer.

There is also the three dimension printing (TDP) process. This process is similar to the inkjet processes in employing powdery materials, but these are preferably ceramics and are selectively saturated with a melt of a thermoplastic polymer layer by layer. After every layer of print, a new layer of the powdery material has to be applied. The thermoplast solidifies to form the three-dimensional object. This process is costly, inconvenient and very slow.

Fused deposition modelling (FDM), also known with minor variations as selective deposition modelling (SDM), is the most economical process in terms of material and equipment requirements for the production of three-dimensional objects by printing.

In FDM, two different polymers are melted in nozzles and selectively printed. One of the polymers is a support material which is needed as a temporary base for example. This support material can be removed later, for example by complete or partial dissolving in aqueous systems (in a basic or acidic medium, for example). The other polymer (the build material) forms the actual 3D object. Again, printing takes place layer by layer. The FDM process was first described in U.S. Pat. No. 5,121,329.

In the very first embodiment, ABS terpolymers were used both as build and as support material. After printing, the support material was then removed using predetermined breaking points.

A more recent development utilizes soluble polymers as support material which are then dissolved as described above. Owing to the thermal type of printing, the choice of possible support materials is greatly limited in respect of the glass transition or melting temperature.

U.S. Pat. No. 5,503,785 discloses polyethylene oxides, glycol-based polymers or polyvinylpyrrolidone as soluble materials. However, these materials all have a too low softening temperature or a too low solubility to ensure rapid printing.

EP 1,105,828 proposes poly(2-ethyl-2-oxazoline) for use as a support material. However, this material has a low glass transition temperature at just 58° C. and hence is scarcely usable for a printing operation. Printing would have to be done accordingly at low temperatures using a similarly sensitive build material.

EP 1 773 560 and EP 1 194 274 propose combinations of plasticizers and highly acid-containing, water-soluble polymers. However, anhydride formation during printing at high temperatures affects adversely the solubility and the melt viscosity of these support materials.

WO 2010 045 147 discloses impact-modified terpolymers of styrene, methacrylic acid and butyl acrylate, commercially available from Innocycling GmbH & Co. KG under the name Belland® 88140. However, these materials likewise exhibit a non-ideal, retarded solubility in combination with merely insufficiently improved thermal stability.

Prior art support materials do not at one and the same time meet the stated requirements of a high glass transition temperature, high thermal stability and removability in relatively weakly basic media, for example at pH 8.

PROBLEM

The problem addressed by the present invention was that of providing a novel FDM 3D printing process. This process shall include a suitable support material which is thermally stable and, on the other hand, is rapidly and completely removable after printing by dissolving.

The problem was more particularly that of providing a support material for this process that is stable at 200° C. for at least 1 h and during that time does not change lastingly in terms of mechanical and solubility properties. Printing shall accordingly be possible at above 100° C. and the choice of build materials shall accordingly be expanded.

A further problem addressed by the present invention was that of providing a FDM process wherein the support material can be removed under milder conditions—for example in respect of pH and/or dissolution temperature—compared with the prior art.

The support material shall further be distinctly faster to remove than in the prior art under comparable conditions.

In this regard, the problem addressed by the present invention was more particularly that of providing in particular embodiments a dissolution process in a pH range between 6 and 9, which is relatively uncritical for the user of the printer.

Further problems addressed by the present invention and not mentioned explicitly will be apparent from the overall context of the following description, claims and examples.

SOLUTION

The problems were solved by a novel FDM 3D printing process involving the use of a novel support material. This support material is a formulation containing at least 60% by weight, preferably at least 80% by weight and more preferably at least 90% by weight of a copolymer which contains 30% to 60% by weight of maleic anhydride and 30% to 60% by weight of monomers copolymerizable with maleic anhydride. This support material is at least 60% by weight, preferably at least 80% by weight and more preferably at least 90% by weight soluble in aqueous media at a pH between 6 and 14.

It is rare for the free-radical homopolymerization of maleic anhydride to lead to high conversions and molecular weights. However, maleic anhydride is copolymerizable with a multiplicity of vinyl monomers. Particularly high reaction rates, conversions and molar masses are achievable in copolymerizations with electron-rich monomers. The maleic anhydride-copolymerizable monomers according to the invention are such electron-rich monomers. To judge whether a monomer is an electron-rich monomer, the Q/e scheme of Alfred and Price, with which a person skilled in the art will be familiar, can be used. Compounds where e≤0 are electron rich and hence qualify according to the invention as monomers copolymerizable with maleic anhydride.

The monomers copolymerizable with maleic anhydride are exclusively monomers which are copolymerizable with maleic anhydride on their own without further monomers. Examples thereof are styrene, isobutylene or isobutyl vinyl ether. Styrene and isobutylene are particularly preferred. Further examples are given in the "Handbook of Polymer Synthesis—Part A" (edited by H. R. Kricheldorf), Marcel Dekker, Inc., New York, Basle, Hong Kong 1992 in the chapter "Maleic acid and related monomers".

An FDM 3D printing process for the purposes of this invention is a process in which at least one build material and at least one support material are each initially present as solid polymers then melted and thereafter printed.

A support material for the purposes of this invention is a material which is printed as described above to form, for example, base structures or other auxiliary functions in the printing operation and after printing has taken place, is removed again by dissolving.

This invention comprises exclusively support materials of this definition for FDM 3D printing processes of the above-recited definition.

Surprisingly, these copolymers turn out to be soluble at as low a pH as pH 8.

In a first preferred embodiment, the support material is a copolymer of 50% to 60% by weight of styrene and 40% to 50% by weight of maleic anhydride.

It is particularly preferable especially in view of established FDM 3D printing processes and the temperatures employed therein for the glass transition temperatures of copolymers to differ from the glass transition temperatures of the particular build material used by not more than 25° C., preferably not more than 10° C. and more preferably 5° C. The glass transition temperatures for an FDM 3D printing process using an ABS having a glass transition temperature of 108° C. as build material for example are between 83 and 133° C., more precisely between 98 and 118° C. and especially between 103 and 113° C.

After printing, the support material is preferably dissolved in an aqueous medium at a pH of between 6 and 14 and more preferably between 7 and 9. What is surprising here is that a sufficient rate of dissolution can be achieved for a mechanically and thermally suitable support material at pH values between 6 and 9, which are uncritical for the user.

The pH values stated in the context of the invention relate to the solution medium before dissolving the support material. It will be appreciated that this pH will change during the dissolving. To counteract this change to some extent at least, the solution medium may alternatively be in a buffered state.

The molecular weight $M_w$ of the copolymer used as support material is generally between 25 000 and 500 000, preferably between 50 000 and 300 000 and more preferably between 100 000 and 200 000.

It was a further surprise to find that these already suitable materials can be further improved, particularly in terms of flexibility and processing temperature, by adding further comonomers. Two particularly preferred embodiments were found for this.

In the first particularly preferred embodiment, the copolymers additionally include between 2% and 20% by weight of (meth)acrylic acid. The copolymer is in this case more particularly preferably made up of 40% to 55% by weight, in particular between 44 and 51% by weight, of styrene, 35% to 50% by weight and more particularly between 39% and 46% by weight of maleic anhydride and 3% to 18% by weight and more particularly 4% to 16% by weight of (meth)acrylic acid.

In the second particularly preferred embodiment, the copolymers additionally include 2% to 40% by weight of a methoxy polyethylene glycol methacrylate having a molecular weight $M_w$ between 250 and 2000 and preferably between 400 and 800. The copolymer in this case is very particularly preferably made up of 35% to 55% by weight and more particularly between 37% and 51% by weight of styrene, 30% to 50% by weight and more particularly between 32% and 46% by weight of maleic anhydride and 3% to 35% by weight and more particularly 4% to 32% by weight of methoxy polyethylene glycol methacrylate.

Irrespective of the embodiment, the copolymers are obtainable via solution or bulk polymerization. A bulk polymerization process can be a continuous process carried out in a kneader or an extruder. Preferably, the present invention copolymers for use in or as support material are produced by solution polymerization with subsequent removal of the solvent.

In addition, the copolymers may contain up to 40% by weight and preferably not more than 20% by weight of further non-functionalized monomers copolymerizable with styrene. Preferably, these are alkyl acrylates such as ethyl acrylate, propyl acrylate or butyl acrylate.

In a first embodiment, the copolymer in the support materials is more particularly a copolymer of 50% to 60% by weight of styrene or isobutylene and 40% to 50% by weight of maleic anhydride.

In a second embodiment, the copolymer in the support materials is more particularly a copolymer of 40% to 55% by weight of styrene or isobutylene, 35% to 50% by weight of maleic anhydride and 4% to 16% by weight of (meth)acrylic acid.

In a third embodiment, the copolymer in the support materials is more particularly a copolymer of 35% to 55% by weight of styrene or isobutylene, 30% to 50% by weight of maleic anhydride and 4% to 35% by weight of methoxy polyethylene glycol methacrylate.

The support materials may additionally contain rheological modifiers, stabilizers, precipitated or pyrogenous silicas, plasticizers, pigments and/or impact modifiers. Further additives are conceivable depending on the intended use, and will be apparent from the processing conditions in each case.

Pigments can have the advantage that the support material is easier to distinguish from the build material before printing or during printing.

Rheological modifiers can be used to adjust the melt viscosity during printing to specific values.

Precipitated or pyrogenous silicas likewise serve to adjust the melt viscosity, for example to increase the pseudo-plasticity.

Plasticizers are useful to adjust the flexibility and the melt viscosity of the support material to specific values. Typical plasticizers will be known to a person skilled in the art, and include, but are not limited to, esters and/or ethers of citric acid, aliphatic, cycloaliphatic or aromatic phthalates, esters of adipic acid, alkyl and/or aryl phosphates, polyethers, esters of glycerol and combinations thereof. Plasticizers can be used in amounts of 0% by weight to 20% by weight, preferably 3% by weight to 15% by weight and even more preferably between 5% by weight and 10% by weight, based on the overall mass of the support material.

Stabilizers can be used to additionally improve the thermal stability for example. Stabilizers for improving storage stability, such as UV stabilizers for example, can also be added.

In addition, the support materials may contain up to 40% by weight and preferably not more than 30% by weight of components for improving the flexibility. These components may be impact modifiers as well as plasticizers.

Components generally used as impact modifiers find application in various materials of construction, particularly in PVC and PMMA but also styrene-maleic anhydride copolymers, and will be familiar to a person skilled in the art. For the purposes of the present invention, it is particularly suitable to use water-soluble, at least water-dispersible components that find general use as impact modifiers. However, owing to the fine dispersal within the support material even completely water-insoluble components that find general use as impact modifiers are also suitable for this purpose.

Olefin-based impact modifiers are concerned in one possible embodiment. A person skilled in the art will know that styrene-maleic anhydride copolymers which have been modified with olefins have improved impact resistance. Various compositions and methods of making are described in DE 2246726. The presence of the rubber during the polymerization provides covalent attachment to the styrene-maleic anhydride copolymer. Suitable rubbers preferably contain at least 65% by weight of butadiene.

Preferred substrates are butadiene homopolymers or block copolymers of the form A-B or A-B-A consisting of styrene and butadiene.

WO 2005 016 978 describes the use of α-olefin polymers and copolymers, for example ethylene, propylene and butylene polymers and copolymers, as impact modifiers for styrene-maleic anhydride copolymers. These impact modifiers have the advantage of enhanced thermal stability. This trait is also shown by hydrogenated block copolymers of styrene and butadiene.

The polymerization of the maleic anhydride copolymers according to the invention preferably takes place in the presence of the rubbers. What is advantageous is a reaction temperature above the softening point of the rubber or the presence of a solvent for the rubber. This can be, for example, styrene in the case of a bulk polymerization. The reaction is started via thermal initiation or via addition of initiators that form free radicals.

Suitable impact modifiers further include functional copolymers, such as epoxy- or maleic acid-functionalized polyolefins based on polyethylene or polypropylene for example. Copolymers of ethylene and glycidyl methacrylates or maleic anhydride are concerned specifically. These components may contain further (meth)acrylates. These components are preferably dispersed by compounding in an extruder for example. Another possibility is to polymerize the maleic anhydride copolymers of the present invention in the presence of the functionalized polyolefins.

Core-shell particles are a further group of impact modifiers. The core of core-shell particles usually consists of engineering thermoplastics or elastomers, which are grafted with a second component. Preference is given to producing core-shell particles by two-stage emulsion polymerization. The core material used typically comprises amorphous copolymers having a glass transition temperature below 0° C. such as butyl or ethylhexyl acrylate for example. The shell usually consists of a hard component having a glass transition temperature above 70° C. These polymers are more particularly known for PMMA or PVC as components generally used as impact modifiers. Suitable particle sizes of these emulsion polymers range from 25 nm to 1000 nm, preferably from 50 nm to 600 nm and more preferably from 80 nm to 400 nm.

The shell of the core-shell particles consists, for example, of a copolymer of styrene, or of polystyrene-co-methoxy polyethylene glycol methacrylate, which effectuates good compatibility to the copolymer which is the main component of the support material. Preferably, the core and/or the shell of the particle are in a crosslinked state. This leads to a stabilization of the particles and hence to distinctly improved properties of the components generally used as impact modifiers.

The core-shell particles are preferably dispersed via mechanical compounding in a single- or twin-screw extruder for example. In a further embodiment, the core-shell particles are dispersed in a solvent and the maleic anhydride copolymer is polymerized in their presence.

Components generally used as impact modifiers can be used in amounts of 3% by weight to 30% by weight, preferably 8% by weight and 22% by weight and even more preferably between 10% by weight and 15% by weight, based on the overall mass of the support material.

Further additives may be additives for preventing the build-up of static or for modifying the surface properties for example. They may further be adhesion promoters to improve the adherence to the build material.

EXAMPLES

Methods of Measurement

Drying of As-Synthesized Samples:

The samples were dried 6 hours at 50° C. and then overnight at 150° C. in a vacuum drying cabinet.

GPC:

Weight average molecular weights were determined by gel permeation chromatography (GPC) using polystyrene standards (manufacturer: Polymer Laboratories Ltd.). The measurements were carried out at an oven temperature of 35° C. The following column combination was used: PL Guard Column, 10 μm, 5 cm, 7.5 mm in diameter, PLgel $10^6$ Å, 10 μm, 30 cm, 7.5 mm in diameter, PLgel $10^5$ Å, 10 μm, 30 cm, 7.5 mm in diameter, PLgel $10^4$ Å, 5 μm, 30 cm, 7.5 mm in diameter, PLgel $10^3$ Å, 5 μm, 30 cm, 7.5 mm in diameter (manufacturer: Polymer Laboratories Ltd.) The eluent used was THF with 0.1% by volume of trifluoroacetic acid.

DSC

The DSC measurements were carried out on a DSC1 from METTLER TOLEDO in nitrogen 5.0 atmosphere.

Glass transition temperatures were determined in accordance with DIN ISO 11357.

Melt Flow Index (MFI)

The MFI was determined on a melt flow index tester from Göttfert, type MPS-D. Diameter of die=1 mm. Unless stated otherwise, the measurement was carried out at a temperature of 200° C. and an emplaced weight of 10 kg. Samples were dried by the above-described method before being measured.
Determination of Solubility:

50 mg of the substance dried by the above method were added under agitation to 10 mL of heated solutions at 75° C. (pH 8: phosphate buffer $Na_2HPO_4*2\ H_2O$; c=0.2 mol/l. pH 14: NaOH, 0.1 molar).

At the time of complete solubility, either a clear homogeneous solution is present, or there is a milky dispersion.
Starting Materials Used Styrene, for synthesis, stabilized with 10-20 ppm of 2,6-di-tert-butyl-4-methylphenol Maleic anhydride, dilauroyl peroxide, 2-butanone and other monomers, for synthesis Bisomer MPEG550MA, from Cognis UK Ltd. (a methoxy polyethylene glycol methacrylate with a molecular weight of 550 g/mol for the polyethylene glycol moiety) 2-Ethylhexyl thioglycolate, Dr. Spiess Chemische Fabrik, 99.8% pure Example 1

In a double-shell vessel equipped with thermometer, reflux condenser and nitrogen inlet tube, 273 g of 2-butanone, 66 g of styrene and 59 g of maleic anhydride were initially charged and heated under $N_2$ atmosphere to 75° C. internal temperature within 30 min with stirring. Thereafter, 199 g of styrene, 176 g of maleic anhydride, 228 g of 2-butanone, 5 g of dilauroyl peroxide and 2.5 g of 2-ethylhexyl thioglycolate were metered into the reactor over 3 hours at a constant rate. Finally, the batch was after-reacted at 75° C. internal temperature for 3 hours and cooled down to room temperature.

Example 2

In a double-shell vessel equipped with thermometer, reflux condenser and nitrogen inlet tube, 383 g of 2-butanone, 56 g of styrene and 50 g of maleic anhydride and 19 g of Bisomer MPEG550MA were initially charged and heated under $N_2$ atmosphere to 75° C. internal temperature within 30 min with stirring. Thereafter, 169 g of styrene, 150 g of maleic anhydride, 56 g of Bisomer MPEG550MA, 118 g of 2-butanone, 5 g of dilauroyl peroxide and 1 g of 2-ethylhexyl thioglycolate were metered into the reactor over 3 hours at a constant rate. Finally, the batch was after-reacted at 75° C. internal temperature for 3 hours and cooled down to room temperature.

Example 3

In a double-shell vessel equipped with thermometer, reflux condenser and nitrogen inlet tube, 373 g of 2-butanone, 56 g of styrene and 56 g of maleic anhydride, 19 g of Bisomer MPEG550MA and 6 g of methacrylic acid were initially charged and heated under $N_2$ atmosphere to 75° C. internal temperature within 30 min with stirring. Thereafter, 169 g of styrene, 169 g of maleic anhydride, 56 g of Bisomer MPEG550MA, 19 g of methacrylic acid, 379 g of 2-butanone, 5 g of dilauroyl peroxide and 2.5 g of 2-ethylhexyl thioglycolate were metered into the reactor over 3 hours at a constant rate. Finally, the batch was after-reacted at 75° C. internal temperature for 3 hours and cooled down to room temperature.

Example 4

In a double-shell vessel equipped with thermometer, reflux condenser and nitrogen inlet tube, 349 g of 2-butanone, 44 g of styrene and 40 g of maleic anhydride and 36 g of Bisomer MPEG550MA were initially charged and heated under $N_2$ atmosphere to 75° C. internal temperature within 30 min with stirring. Thereafter, 178 g of styrene, 158 g of maleic anhydride, 144 g of Bisomer MPEG550MA, 251 g of 2-butanone, 5 g of dilauroyl peroxide and 3 g of 2-ethylhexyl thioglycolate were metered into the reactor over 3 hours at a constant rate. Finally, the batch was after-reacted at 75° C. internal temperature for 3 hours and cooled down to room temperature.

Example 5

In a double-shell vessel equipped with thermometer, reflux condenser and nitrogen inlet tube, 349 g of 2-butanone, 54 g of styrene, 48 g of maleic anhydride and 18 g of acrylic acid were initially charged and heated under $N_2$ atmosphere to 75° C. internal temperature within 30 min with stirring. Thereafter, 216 g of styrene, 192 g of maleic anhydride, 72 g of acrylic acid, 251 g of 2-butanone, 6 g of dilauroyl peroxide and 3 g of 2-ethylhexyl thioglycolate were metered into the reactor over 3 hours at a constant rate. Finally, the batch was after-reacted at 75° C. internal temperature for 3 hours and cooled down to room temperature.

Example 6

In a double-shell vessel equipped with thermometer, reflux condenser and nitrogen inlet tube, 334 g of 2-butanone, 53 g of isobutyl vinyl ether and 49 g of maleic anhydride were initially charged and heated under $N_2$ atmosphere to 75° C. internal temperature within 30 min with stirring. Thereafter, 214 g of isobutyl vinyl ether, 198 g of maleic anhydride, 181 g of 2-butanone, 5 g of dilauroyl peroxide and 2.5 g of 2-ethylhexyl thioglycolate were metered into the reactor over 3 hours at a constant rate. Finally, the batch was after-reacted at 75° C. internal temperature for 3 hours and cooled down to room temperature.

Precursor for Examples 7 and 8

In a Witt pot equipped with blade stirrer, thermometer and reflux condenser 75 g of ethylene-propylene copolymer (55: 45, BUNA® EP G 2050, Lanxess) and 252 g of butyl acetate are initially charged, stirred at 280 revolutions per minute, heated to 110° C. and devolatilized with dry ice. After 2 hours, 1.5 g of tert-butyl peroctoate are added to the initial charge and then the addition of 148 g of methyl methacrylate, 148 g of butyl methacrylate and 4.5 g of tert-butyl peroctoate as a mixture is started. After 3 hours of add time and 1 hour after add end, 0.6 g of tert-butyl peroctoate is added and the temperature is maintained at 105-110° C. for a further 7 hours. Throughout the entire reaction time a constant stream of gaseous nitrogen is passed over the batch. The solution cooled down to room temperature after the polymerization has ended is diluted to about 35% with butyl acetate. The product is bluish, milkily cloudy. The viscosity (about 35% strength) is about 1000-2000 mPa s.

Example 7

In a double-shell vessel equipped with thermometer, reflux condenser and nitrogen inlet tube, 195 g of 2-butanone and 274 g of the above precursor were initially charged and heated under $N_2$ atmosphere to 75° C. internal temperature within 30 min with stirring. Thereafter, 142 g of styrene, 127 g of maleic anhydride, 115 g of Bisomer MPEG550MA, 347 g of 2-butanone, 4 g of dilauroyl peroxide and 2 g of 2-ethylhexyl thioglycolate were metered into the reactor over 3 hours at a constant rate. Finally, the batch was after-reacted at 75° C. internal temperature for 3 hours and cooled down to room temperature.

Example 8

In a double-shell vessel equipped with thermometer, reflux condenser and nitrogen inlet tube, 284 g of 2-butanone and 137 g of the above-described precursor were initially charged and heated under $N_2$ atmosphere to 75° C. internal temperature within 30 min with stirring. Thereafter, 160 g of styrene, 143 g of maleic anhydride, 130 g of Bisomer MPEG550MA, 347 g of 2-butanone, 4.5 g of dilauroyl peroxide and 2.2 g of 2-ethylhexyl thioglycolate were metered into the reactor over 3 hours at a constant rate. Finally, the batch was after-reacted at 75° C. internal temperature for 3 hours and cooled down to room temperature.

Example 9

In a double-shell vessel equipped with thermometer, reflux condenser and nitrogen inlet tube, 349 g of 2-butanone, 54 g of styrene, 48 g of maleic anhydride and 18 g of ethyl acrylate were initially charged and heated under $N_2$ atmosphere to 75° C. internal temperature within 30 min with stirring. Thereafter, 216 g of styrene, 192 g of maleic anhydride, 72 g of ethyl acrylate and 251 g of 2-butanone, 6 g of dilauroyl peroxide and 3 g of 2-ethylhexyl thioglycolate were metered into the reactor over 3 hours at a constant rate. Finally, the batch was after-reacted at 75° C. internal temperature for 3 hours and cooled down to room temperature.

TABLE 1

| | Examples | | | | |
|---|---|---|---|---|---|
| | Solubility | | | | |
| Example | [min] at pH 8 | [min] at pH 14 | $T_g$ [° C.] | $M_w$ [g/mol] | Melt flow index [g/10 min] |
| 1 | 180 | 25 | 157 | 91 700 | 1.1 |
| 2 | 100 | 15 | 132 | 180 000 | 31 |
| 3 | 65 | 10 | 133 | 133 000 | n.d. |
| 4 | 82 | 10 | 97 | 130 000 | 47 |
| 5 | 110 | 12 | 125 | 85 000 | 0.3 |
| 6 | 30 | 10 | 98 | 47 000 | 62 |
| 7 | 120 | 80 | 41/113 | n.d. | 76 |
| 8 | 80 | 20 | 113 | n.d. | 61 |
| 9 | 250 | 40 | 110 | n.d. | 42 |

The invention claimed is:

1. A support material, comprising:
   at least 60% by weight of a copolymer comprising from 30% to 60% by weight of maleic anhydride and from 30% to 60% by weight of a monomer copolymerizable with maleic anhydride,
   wherein the support material is at least 60% by weight soluble in an aqueous media at a pH between 6 and 14.

2. The support material according to claim 1, comprising:
   at least 60% by weight of a copolymer comprising from 30% to 60% by weight of styrene and from 30% to 60% by weight of maleic anhydride.

3. The support material according to claim 1,
   wherein the copolymer further comprises:
   from 2% to 20% by weight of (meth)acrylic acid.

4. The support material according to claim 1, wherein the copolymer further comprises:
   from 2% to 40% by weight of a methoxy polyethylene glycol methacrylate having a molecular weight MW between 250 and 2000.

5. The support material according to claim 1,
   wherein the copolymer has a glass transition temperature that differs by not more than 25° C. from a glass transition temperature of a build material used.

6. The support material according to claim 1,
   wherein the copolymer has a glass transition temperature between 83 and 133° C.

7. The support material according to claim 1,
   wherein the support material is soluble in an aqueous medium at a pH between 7 and 9.

8. The support material according to claim 1,
   wherein the copolymer has a molecular weight MW between 50 000 and 300 000.

9. The support material according to claim 1, comprising: from 50% to 60% by weight of styrene or isobutylene and from 40% to 50% by weight of maleic anhydride.

10. The support material according to claim 3, comprising:
    from 40% to 55% by weight of styrene or isobutylene;
    from 35% to 50% by weight of maleic anhydride; and
    from 4% to 16% by weight of (meth)acrylic acid.

11. The support material according to claim 4, comprising:
    from 35% to 55% by weight of styrene or isobutylene;
    from 30% to 50% by weight of maleic anhydride; and
    from 4% to 35% by weight of methoxy polyethylene glycol methacrylate.

12. The support material according to claim 1, further comprising:
    rheological modifiers, plasticizers, precipitated or pyrogenous silicas, stabilizers, pigments, impact modifiers or a combination thereof.

* * * * *